United States Patent
Bandoh et al.

(10) Patent No.: US 7,393,886 B2
(45) Date of Patent: Jul. 1, 2008

(54) CEMENT DISPERSANT AND CONCRETE COMPOSITION CONTAINING THE DISPERSANT

(75) Inventors: Hirofumi Bandoh, Chigasaki (JP); Wernher M. Danzinger, Hiratsuka (JP); Jun Imamura, Hiratsuka (JP); Kaname Saitoh, Yokohama (JP); Tetsu Tomoyose, Chigasaki (JP); Atsushi Kobayashi, Hiratsuka (JP); Akira Ikeda, Funabashi (JP); Seiichi Koshisaka, Ichihara (JP)

(73) Assignees: Sika Ltd., Kanagawa (JP); Toho Chemical Industry Co., Ltd., Tokyo (JP)

( * ) Notice: Subject to any disclaimer, the term of this patent is extended or adjusted under 35 U.S.C. 154(b) by 142 days.

(21) Appl. No.: 10/556,071

(22) PCT Filed: Jun. 25, 2004

(86) PCT No.: PCT/JP2004/009031

§ 371 (c)(1),
(2), (4) Date: Nov. 8, 2005

(87) PCT Pub. No.: WO2006/011182

PCT Pub. Date: Feb. 2, 2006

(65) Prior Publication Data

US 2007/0039516 A1    Feb. 22, 2007

(51) Int. Cl.
*C08K 3/00* (2006.01)
(52) U.S. Cl. ............ 524/2; 524/4; 524/5; 526/304; 106/724; 106/727; 106/728; 106/823
(58) Field of Classification Search ............ 524/2, 524/4, 5; 526/304; 106/724, 727, 728, 823
See application file for complete search history.

(56) References Cited

U.S. PATENT DOCUMENTS

| 4,284,433 A | 8/1981 | Aignesberger et al. |
| 6,294,015 B1 | 9/2001 | Yamashita et al. |
| 6,680,348 B1 | 1/2004 | Amaya et al. |

FOREIGN PATENT DOCUMENTS

| JP | A 54-139929 | 10/1979 |
| JP | A 3-75252 | 3/1991 |
| JP | A 6-157100 | 6/1994 |
| JP | A 8-169741 | 7/1996 |
| JP | A 9-40446 | 2/1997 |
| JP | B2 3029827 | 2/2000 |
| JP | B2 3235002 | 9/2001 |
| JP | B2 3336456 | 8/2002 |
| JP | A 2004-2174 | 1/2004 |
| WO | WO 03/091180 A1 | 11/2003 |

*Primary Examiner*—Bernard Lipman
(74) *Attorney, Agent, or Firm*—Oliff & Berridge, PLC

(57) ABSTRACT

A superior cement dispersant and a concrete composition containing the cement dispersant, the cement dispersant being a water-soluble amphoteric copolymer which contains an alkylene oxide adduct of a polyamide polyamine having an unsaturated group and at least two types of polyalkylene glycol ester. When the cement dispersant is compounded with a concrete composition, the dispersion performance thereof increases with time, and the concrete viscosity is effectively decreased. The cement dispersant composition contains a water-soluble amphoteric copolymer or the neutralized salt thereof as an essential component, which is obtained by copolymerizing an alkylene oxide adduct of a polyamide polyamine having an unsaturated group, (meta)acrylic acid or an alkali metal, ammonium, or alkanolamine salt thereof, an ester of an alkylene glycol and methacrylic acid, and an ester of an alkylene glycol and acrylic acid. In addition, the concrete composition containing the above cement dispersant is also disclosed.

7 Claims, No Drawings

CEMENT DISPERSANT AND CONCRETE COMPOSITION CONTAINING THE DISPERSANT

TECHNICAL FIELD

The present invention relates to a cement dispersant and a concrete composition containing the dispersant. In more particular, the present invention relates to a cement dispersant which is a water-soluble amphoteric copolymer containing an alkylene oxide adduct of a polyamide polyamine having an unsaturated group and two or more types of polyalkylene glycol esters, has dispersibility which increases with time elapsed when it is kneaded with a cement composition such as concrete and has a superior slump retention property when it is used alone or is compounded with a common additive for mortar and concrete, and a concrete composition containing the dispersant.

BACKGROUND ART

Heretofore, as cement dispersants, for example, polymelamine sulfonates, lignin sulfonates, copolymers of an olefin and maleic acid, and polycarboxylic acid-base dispersants have been used. However, due to various problems such as poor working efficiency at large building construction sites at which concrete mixer cars are forced to wait for a long period of time, lower profitability of suppliers of ready-mixed concrete since supply areas have to be decreased due to an inferior slump retention property, and in relation thereto, quality degradation which occurs when the time required for transportation of ready-mixed concrete is increased, improvement in slump retention has been always and enthusiastically required. Although polycarboxylic acid-base dispersants have a good slump retention property as compared that of previous generation cement dispersants, in the present circumstances in which the polycarboxylic acid-base dispersants have steadily and progressively spread in the related business fields, a slump retention property which is much superior to that of the current available dispersant has been strongly desired. In order to respond to this requirement, development of controlled-release polymers has been implemented for realizing a polymer which exhibits a slump retention property with time elapsed. Techniques relating to controlled-release cement dispersants have been disclosed. Patent Document 1 discloses palletized dispersants. Patent Documents 2 and 3 disclose a hydrolysable crosslink copolymer which makes use of an alkali condition in a cement dispersant liquid. Patent Document 4 discloses a time-release cement admixture containing poly(succinic imide). However, as for the techniques described above, improvement has been further desired in terms of product performance and effectiveness.

In addition, Patent Documents 5 and 6 disclose a copolymer containing a methacrylic acid ester and an acrylic acid ester. However, according to the documents mentioned above, the controlled-release performance using an alkali condition in a cement dispersant liquid has not been invented.

In addition, Patent Documents 7 and 8 disclose a carboxylic acid-base dispersant for high-strength concrete as a copolymer compound containing a polyamide polyamine or an alkylene oxide adduct thereof.

Patent Document 1: JP-A 54-139929
Patent Document 2: JP-A 03-075252
Patent Document 3: JP-A 06-157100
Patent Document 4: JP-A 08-169741
Patent Document 5: JP-A 9-40446
Patent Document 6: Japanese Patent No. 3029827
Patent Document 7: Japanese Patent No. 3235002
Patent Document 8: Japanese Patent No. 3336456

DISCLOSURE OF INVENTION

Problems to be Solved by the Invention

The present invention was made in consideration of the situation described above, and an object of the present invention is to provide a cement dispersant which has stable product performance as a controlled-release polymer, dispersibility which increases with time elapsed, and a superior effect of decreasing concrete viscosity, and in addition, can achieve stable slump with time elapsed when it is used alone or is compounded with a cement dispersant having a poor slump retention property, and a concrete composition using the above cement dispersant.

Means for Solving the Problems

Through intensive research carried out by the inventors of the present invention in order to achieve the above object, it was found that a water-soluble amphoteric copolymer, which contains an alkylene oxide adduct of a polyamide polyamine having an unsaturated group and at least two or more types of polyalkylene glycol esters, is a cement dispersant which is superior in slump retention property and in decrease of concrete viscosity, and as a result, the present invention was made.

The present invention relates to a cement dispersant comprising a water-soluble amphoteric copolymer, or a partly or a fully neutralized salt thereof, in which, when the cement dispersant is added to and is compounded with a concrete composition, dispersion performance increases with time elapsed. The copolymer described above is formed by copolymerizing a monomer mixture containing as main monomer components, at least one compound (compound A) obtained by addition of 0 to 8 moles of an alkylene oxide having 2 to 4 carbon atoms with respect to one equivalent of a residual amino group of a polyamide polyamine obtained by condensation of 1.0 mole of a polyalkylene polyamine, 0.5 to 0.95 moles of a dibasic acid or an ester of the dibasic acid with a lower alcohol having 1 to 4 carbon atoms, and 0.05 to 0.70 moles of acrylic acid or methacrylic acid, or an ester of the acrylic acid or methacrylic acid with a lower alcohol having 1 to 4 carbon atoms and, at least one compound (compound B) represented by general formula (1),

(in the formula, $R^1$ represents a hydrogen atom or a methyl group, and M represents a hydrogen atom, an alkali metal, an alkali earth metal, an ammonium group, or an alkanol ammonium group), at least one compound (compound C) represented by general formula (2),

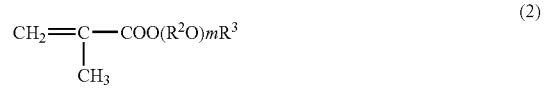

(in the formula, $R^2$ represents an alkylene group having 2 to 4 carbon atoms, $R^3$ represents a hydrogen atom or an alkyl group having 1 to 4 carbon atoms, and m represents the number of addition molecules of a polyalkylene glycol and is an integer of 1 to 100), and at least one compound (compound D) represented by general formula (3),

$$CH_2=CH-COO(R^4O)nR^5 \quad (3)$$

(in the formula, $R^4$ represents an alkylene group having 2 to 4 carbon atoms, $R^5$ represents a hydrogen atom or an alkyl group having 1 to 4 carbon atoms, and n represents the number of addition molecules of a polyalkylene glycol and is an integer of 1 to 100).

As described above, the compound A used in the present invention is a compound formed by addition of a specific amount of an alkylene oxide (compound d) to a polyamide polyamine obtained by condensation of a polyalkylene polyamine (compound a), a dibasic acid or an ester of the dibasic acid with a lower alcohol having 1 to 4 carbon atoms (compound b), and acrylic acid or methacrylic acid, or an ester of the acrylic acid or methacrylic acid with a lower alcohol having 1 to 4 carbon atoms (compound c). Examples of the polyalkylene polyamine, which is the compound a, include diethylenetriamine, triethylenetetramine, tetraethylenepentamine, pentaethylenehexamine, dipropylenetriamine, tripropylenetetramine and tetrapropylenepentamine, and among those mentioned above, diethylenetriamine and triethylenetetramine are preferable from both points of effectiveness and economical angle. Examples of the dibasic acid or the ester thereof with a lower alcohol having 1 to 4 carbon atoms, which is the compound b, include malonic acid, succinic acid, fumaric acid, maleic acid, glutaric acid, adipic acid, pimelic acid, phthalic acid, azelaic acid, sebacic acid, and an ester thereof with a lower alcohol having 1 to 4 carbon atoms, such as methanol, ethanol, propanol, butanol, or an isomer thereof if present. Of those mentioned above, adipic acid is most preferable from both points of effectiveness and economical angle. Examples of acrylic acid or methacrylic acid, or the ester thereof with a lower alcohol having 1 to 4 carbon atoms, which is the compound c, include acrylic acid, methacrylic acid, methyl acrylate, methyl methacrylate, ethyl acrylate, ethyl methacrylate, propyl acrylate, propyl methacrylate, butyl acrylate and butyl methacrylate may be mentioned. The polyamide polyamine comprising three components of the compounds a, b and c can be easily obtained by the conventional polycondensation technique. In addition, the alkylene oxide having 2 to 4 carbon atoms, which is the compound d, to be added to amino residues of the polyamide polyamine is ethylene oxide, propylene oxide or butylene oxide. Those alkylene oxides mentioned above may be used alone or in combination.

As preparation of the polyamide polyamine, that is, the polycondensation reaction of the compounds a, b and c, for example, there are two-stage reaction method comprising polycondensation of only the compound a and the compound b and thereafter further with polycondensation the compound c as a monobasic acid, or one-stage reaction method comprising simultaneous polycondensation of the compounds a, b and c from the start. However, in both cases described above, since this polycondensation reaction, that is, this amidization reaction proceeds in parallel with an amide interchange reaction, acrylic acid residues or methacrylic acid residues derived from the compound c is finally located at the terminal of the polyamide chain, and hence it can be assumed that the same result is obtained in the above two cases.

Next, the reaction molar ratios of the above three components forming the polyamide polyamine will be described. The reaction molar ratio of the compound b (dibasic acid or the ester thereof) with respect to 1 mole of the compound a (polyalkylene polyamine) is 0.5 to 0.95 moles. A polycondensate product of the compound a and the compound b reacted in the molar ratios defined above, produces, on the average, a polyamide with a chain length in a predetermined range comprising polycondensation from (2 moles of a polyalkylene polyamine: 1 mole of a dibasic acid) to (20 moles of a polyalkylene polyamine: 19 moles of a dibasic acid), and therefore, a dispersant obtained by using the polyamide exhibits high water reducing property and a slump retention property. When the chain length of this polyamide is shorter than the case described above (in the case in which the reaction ratio is less than 0.5 moles), the slump retention property of a dispersant obtained therefrom is extremely decreased. On the contrary, when the chain length is longer than that (in the case in which the reaction ratio is more than 0.95 moles), it is not preferable since the water reducing property is remarkably degraded.

The polyamide polyamine of the present invention has 0.10 moles [in the case of a:b:c=1.0:0.5:0.05 (moles)] to 14 moles [in the case of a:b:c=1.0:0.95:0.70 (moles)] of acrylic acid residues or methacrylic acid residues per one molecule, but a preferable range is 0.5 to 2.0 moles from the standpoint of effect. When the value is less than 0.5 moles (for example, in the case of a:b=1.0:0.5, and the ratio in quantity of the compound c to the compound a is less than 0.25), the proportion of the compound A obtained from this ratio in the final copolymer decreases, and the property as a cement dispersant is seriously diminished. On the other hand, when the value is more than 2.0 moles (for example, in the case of a:b=1.0:0.95, and the ratio in quantity of the compound c to the compound a is more than 0.10), the copolymer has an excessively three-dimensional structure, and as a result, a sufficient effect cannot be obtained.

Examples of the compound B used in the present invention include acrylic acid or methacrylic acid, or their sodium, potassium, ammonium, monoethanolamine, diethanolamine and triethanolamine salts, and among those mentioned above, acrylic acid or methacrylic acid is preferable from both effectiveness and economical angle.

As the form of the compound B after it is finally incorporated in the copolymer, an acid or/and a (partially or fully) neutralized salt by sodium, potassium, ammonium, alkanolamine are preferable in terms of water-soluble properties.

Examples of the compound C used in the present invention include methacrylic acid esters of a methoxypolyethylene glycol, methacrylic acid esters of an ethoxypolyethylene glycol, methacrylic acid esters of an ethylene oxide/polypropylene oxide adduct of a lower alcohol, and monomethacrylic acid esters of a polyethylene glycol. When two or more types of oxyalkylene groups are used, random or block addition thereof may be performed.

Examples of the compound D used in the present invention include acrylic acid esters of a methoxypolyethylene glycol, acrylic acid esters of an ethoxypolyethylene glycol, acrylic acid esters of an ethylene oxide/polypropylene oxide adduct of a lower alcohol, and monoacrylic acid esters of a polyethylene glycol. When two or more types of oxyalkylene groups are used, random or block addition thereof may be performed.

The compounding proportion of the compound C and the compound D used in the present invention is not particularly limited; however, when the total of the compounds is set to be 100 percent by weight, the proportion of the compound C: the compound D=5 to 95:5 to 95 (percent by weight), and in particular, the compound C: the compound D=10 to 70:30 to 90 (percent by weight) is preferable since the dispersion performance effectively increases with time elapsed.

A method for producing the compounds can be obtained by a known manufacturing technique for esterification. The known production technique for esterification is a production method performed in this business field or in other fields, and is, for example, a production method in which (meth)acrylic acid and a polyalkylene glycol are dehydrated directly or in the presence of a solvent, a method in which an alkylene oxide is added to (meth)acrylic acid, and a method in which reaction between a polyalkylene glycol and a halogenated (meth)acrylate or acid anhydride thereof is performed.

In addition to the compounds A, B, C, and D of the present invention, as other copolymerizable monomers, following monomers may also be mentioned. For example, they are (non-)aqueous monomers such as methyl (meth)acrylate, ethyl (meth)acrylate, butyl (meth)acrylate and styrene; anionic monomers such as itaconic acid, maleic acid (anhydride), vinyl sulfonic acid, and styrene sulfonic acid; and amide-base monomers such as alkylene oxide adducts of allyl alcohol, acrylamide and an alkylene oxide adduct of acrylamide; and polyalkylene glycol-base monomers such as mono- or di-esters of a polyalkylene glycol and maleic anhydride, and esters of a polyalkylene glycol and itaconic acid.

The compounding proportion of the other copolymerizable monomers described above is 30 percent by weight or less of the total of the all monomers to be charged, is preferably 20 percent by weight or less, and is even more preferably 10 percent by weight.

It is preferable in view of effectiveness that the compounding proportion of the compounds A, B, C, and D used in the present invention is 5 to 25 percent by weight, 1 to 20 percent by weight, 10 to 70 percent by weight, and 10 to 70 percent by weight, respectively, and that the total thereof be 100 percent by weight.

A method for producing the water-soluble amphoteric copolymer according to the present invention is not particularly limited, and for example, a known polymerization method, such as solution polymerization or bulk polymerization, using a polymerization initiator can be used.

The solution polymerization may be performed by both batch and continuous methods. Examples of solvents used in this polymerization includes water; alcohols such as methanol, ethanol and isopropyl alcohol; aromatic and aliphatic hydrocarbons such as benzene, toluene, xylene, cyclohexane and n-hexane; ester or ketone compounds such as ethyl acetate, acetone and methyl ethyl ketone; and cyclic ether compounds such as tetrahydrofuran and dioxane. However, in consideration of the solubility of starting monomers and that of the copolymer to be obtained, at least one selected from the group consisting of water and lower alcohols having 1 to 4 carbon atoms is preferably used, and among those mentioned above, water is more preferably used as the solvent.

When aqueous solution polymerization is carried out, as a radical polymerization initiator, a water-soluble polymerization initiator may be used, and the examples thereof include persulfates such as ammonium persulfate, sodium persulfate and potassium persulfate; hydrogen peroxide; azoamidine compounds such as 2,2'-azobis(2-methylpropionamidine)hydrochloride; cyclic azoamidine compounds such as 2,2'-azobis-2-(2-imidazoline-2-yl)propane hydrochloride; and water-soluble azo compounds including azonitrile compounds such as 2-carbamoylazoisobutyronitrile. In this case, for example, alkali metal sulfites such as sodium hydrogen sulfite, metabisulfite salts, sodium hypophosphite, Fe(II) salts such as Mohr's salt, sodium hydroxymethanesulfonate dihydrate, hydroxylamine salts, thiourea, L-ascorbic acid (salt) and erysorbic acid (salt) may be additionally used as an accelerator.

In addition, in solution polymerization in which a lower alcohol, an aromatic or an aliphatic hydrocarbon, an ester compound or a ketone compound is used as a solvent, as radical polymerization initiators, for example, peroxides such as benzoyl peroxide, lauroyl peroxide, and sodium peroxide; hydroperoxide such as t-butyl hydroperoxide and cumene hydroperoxide; and azo compounds such as azobisisobutyrylonitrile are used. In this case, an accelerator such as an amine compound may also be used. Furthermore, when a mixed solvent of water and a lower alcohol is used, at least one of the above various radical initiators may be optionally selected together with or without an accelerator.

When bulk polymerization is performed, as radical polymerization initiators, for example, peroxides such as benzoyl peroxide, lauroyl peroxide, and sodium peroxide; hydroperoxide such as t-butyl hydroperoxide and cumene hydroperoxide; and azo compounds such as azobisisobutyrylonitrile are raised.

The reaction temperature in copolymerization is not particularly limited; however, when a persulfate is used as an initiator, the reaction temperature is appropriately set in the range of 30 to 95° C.

In copolymerization, a chain transfer agent may be used. As the chain transfer agent, for example, a thiol-base chain transfer agent such as mercaptoethanol, thioglycerol, thioglycolic acid, 2-mercaptopropionic acid, 3-mercaptopropionic acid, thiomalic acid, octyl thioglycolate, octyl 3-mercaptopropionate or 2-mercaptoethanesulfonate may be used. In addition, two or more of the above chain-transfer agents may also be used together.

The polymerization time in copolymerization is not particularly limited; however, for example, the time is suitably 0.5 to 10 hours, preferably 0.5 to 8 hours, and more preferably 0.5 to 6 hours. When the polymerization time is shorter or longer than that described above, the polymerization yield and productivity are unfavorably decreased.

A dropwise addition method in copolymerization is not particularly limited, and for example, the following methods are raised: a method in which after each monomer is partly or entirely charged in a reaction vessel, an initiator and the like are dropwise added; a method in which after one or more of monomers is charged in a reaction vessel, the remaining other monomers, an initiator, a chain transfer agent and the like are dropwise added; a method disclosed in Japanese Patents No. 3235002 and No. 3336456 in which a mixture of monomers, a radical polymerization initiator and a chain transfer agent are individually dropwise added; and a method in which a mixture of each monomer and a chain transfer agent and a radical polymerization initiator are individually dropwise added. In addition, a method is generally performed in which in accordance with the reactivity of individual monomers, timings for charging the monomers are changed from each other.

The molecular weight of the water-soluble amphoteric copolymer obtained in the present invention is not particularly limited; however, the weight average molecular weight (measured in terms of polyethylene glycol by a gel permeation chromatographic method) is preferably in the range of 3,000 to 500,000 and when the molecular weight is out of the above range, the water reducing property and the slump retention property are lost.

Through intensive research on various copolymers carried out by the inventors of the present invention, it was found that a water-soluble amphoteric copolymer containing an alkylene oxide adduct of a polyamide polyamine having a reactive group, and two or more types of polyalkylene glycol esters has a slump retention property and a superior effect of decreasing concrete viscosity, and as a result, the present invention relating to the cement dispersant was made. It has been believed that a cationic group moiety having a specific amide group of the present invention has a certain electric-charge adjusting function, and that a hydrophilic function of a terminal hydroxide group of the polyamide polyamine group contributes to the effect. In addition, it has also been believed that when two or more types of polyalkylene glycol esters (a methacrylic acid ester and an acrylic ester) are well combined with each other, and when the molecular weights thereof are also well combined with each other, the rate of hydrolysis can be adjusted under an alkaline condition of a cement dispersant liquid, and that various controlled-release effects can be obtained thereby. It has been believed that, by the synergic effect described above, superior effects of increasing the dispersion performance with time elapsed and of decreasing concrete viscosity can be obtained; however, the details thereof have not been sufficiently analyzed. Although, since the cement dispersant of the present invention has a chemical structure in which a hydrolysable portion (acrylic acid ester) is present in the polymer, the cement dispersant of the present invention is inexpensive, has a certain degree of freedom in synthesis in which the hydrolysable portion can be freely adjusted, and may not be disadvantageously crosslinked to form a three-dimensional structure; hence, superior features in view of manufacturing and product stability can also be obtained.

Effect of Invention

As has thus been described in detail, the water-soluble amphoteric copolymer containing an alkylene oxide adduct of a polyamide polyamine and two or more types of polyalkylene glycol esters has an effect of decreasing concrete viscosity and also has a controlled-release property in which although initial adsorption of the copolymer to cement is low when it is compounded with a concrete composition, the dispersion performance increases with time elapsed. When the cement dispersant of the present invention is used alone or is compounded with a cement dispersant different therefrom, a stable slump property with time elapsed can be obtained, and hence degradation in quality of ready-mixed concrete can be prevented for a long period of time. In addition, according to the present invention, the water-soluble amphoteric copolymer can also be used alone or in combination with a cement dispersant different therefrom as a preferable high performance AE water reducing agent.

BEST MODE FOR CARRYING OUT THE INVENTION

Although the amount of the cement dispersant composed of the water-soluble amphoteric copolymer of the present invention is changed in accordance with the compounding conditions including a material used for concrete, approximately 0.1 to 1.5% in terms of a solid content is added to the cement. That is, the more dispersant added, the better water reducing property and the slump retention property are. However, if the amount of the cement dispersant is too much excess; setting retardation and in a worst case, hardening failure may be observed. The way to use the cement dispersant of the present invention is the same as that in currently available general cement dispersants, and the cement dispersant of the present invention is added in the form of a stock solution at the time of kneading concrete, or in previously diluted form with kneading water. Alternatively, the cement dispersant may be added after kneading a concrete or a mortar, and the resulting mixture may be again kneaded homogeneously with the concrete and mortar. The present invention also provides a concrete composition containing the cement dispersant of the present invention. Components other than the cement dispersant are conventionally used common components for concrete, such as ordinary Portland cement, early-strength Portland cement, low heat-moderate heat Portland cement, blast furnace cement, silica fume cement and VKC-100SF for cements; aggregates, that is, fine aggregates and course aggregates; and admixtures such as silica fume, fly ash, a calcium carbonate powder, a blast furnace slag powder, an expanding agent and water. In addition, a common cement dispersant different from the cement dispersant of the present invention, an air-entraining agent, a setting retarder, a thickening agent, an accelerator, a separation inhibitor and the like can appropriately be compounded. The compounding proportion of each of these components can easily be determined in accordance with the type of selected component and the purpose of the use.

As mentioned above, many various concrete compositions are present and have a wide variety of compounding proportions. In order to respond those mentioned above, only one specific type of cement dispersant may not be able to sufficiently satisfy required performance in many cases, and cement dispersants having different performances are generally used in combination. As is the case described above, although being used as a primary component of the cement dispersant, the cement dispersant of the present invention may also be used as an auxiliary component for a cement dispersant having poor slump retention property. The cement dispersant of the present invention and a common cement dispersant may be compounded at an optional proportion in the range of 1 to 99 to 99 to 1 on a percent by weight basis. The common cement dispersant is a known cement dispersant, for example, salts of a polycarboxylic acid-base copolymer, salts of a naphthalene sulfonic acid condensate, salts of a melamine sulfonic acid condensate or lignin sulfonic acid salts, which have been disclosed in JP-B 58-383380, JP-B 59-18338, and Japanese Patents No. 2628486, No. 2774445, No. 3235002 and No. 3336456.

In order to obtain a well-conditioned concrete composition, the above-mentioned air-entraining agent, setting retarder, accelerator, separation inhibitor, and thickening agent are generally compounded. In this specification, cement dispersants different from the cement dispersant of the present invention and those additives mentioned above are all called different additives for mortar and concrete.

Accordingly, the present invention also provides an admixture for mortar and concrete composed of the cement dispersant of the present invention and the different additives for mortar and concrete described above, and a concrete composition containing the above admixture for mortar and concrete.

When the air-entraining agent, which is the additive for mortar and concrete, is particularly described, for example, (1) an anionic air-entraining agent, (2) a nonionic air-entraining agent and (3) an amphoteric air-entraining agent may be mentioned. As the anionic air-entraining agents (1), higher alcohol (or alkylene oxide adduct thereof) sulfuric acid ester, alkylbenzene sulfonates, resin soap salts composed of rosin soap or the like, higher alcohol (or alkylene oxide adduct thereof) phosphoric acid ester and the like may be mentioned; as the nonionic air-entraining agents (2), polyalkylene glycols, alkylene oxide adducts of a higher alcohol, fatty acid esters of a polyalkylene glycol, alkylene oxide adducts of a sugar alcohol-fatty acid ester, and the like may be mentioned; and as the amphoteric air-entraining agents (3) composed of anions and cations, for example, an alkyl betaine type, an alkylamide betaine type and an amino acid-base amphoteric activator type may be mentioned. A preferable amount of the air-entraining agent added to the cement dispersant is 0 to 1 percent by weight.

The defoaming agents as the different additives for mortar and concrete are, for example, categorized into (1) activator type defoaming agents, (2) silicone-base defoaming agents and (3) mineral oil-base defoaming agents. As the activator type defoaming agents (1), polyalkylene glycols, alkylene oxide adducts of a higher alcohol, fatty acid esters of an alkylene oxide adduct of a higher alcohol, fatty acid esters of a polyalkylene glycol and the like may be mentioned; as the silicone-base defoaming agents (2), dimethyl silicones, silicone emulsions and the like may be mentioned; and as the mineral oil-base defoaming agents (3), mineral oil emulsions, paraffin wax emulsions, higher alcohol emulsions and the like may be mentioned.

Examples of the setting retarder, which is the additive for mortar and concrete, include (1) inorganic setting retarders such as phosphates, silicon fluoride compounds, zinc oxide, zinc carbonate, zinc chloride, zinc monoxide, copper hydroxide, magnesium salts, borax, and boron oxide; and (2) organic setting retarders such as phosphonic acid derivatives, sugar and its derivatives, hydroxycarboxylates and lignin sulfonates. When the setting retarders are more particularly described, there may be mentioned phosphonic acid derivatives such as aminotri(methylene phosphonic acid), aminotri(methylene phosphonic acid)pentasodium salt, 1-hydroxyethylidene-1,1-diphosphonic acid, ethylenediaminetetra(methylene phosphonic acid), diethylenetriaminepenta(methylene phosphonic acid), and phosphonates of an alkali metal and an alkali earth metal and the derivatives thereof; sugars such as saccharose, maltose, raffinose, lactose, glucose, fructose, mannose, arabinose, xylose, abitose and ribose; and hydroxycarboxylates such as gluconic acid, citric acid, glucoheptonic acid, malic acid and tartaric acid, and alkali metal salts and alkali earth metal salts thereof. The preferable amount of this agent added to the binder such as cement is 0 to 30 parts by weight.

Examples of the accelerator, which is the additive for mortar and concrete, include inorganic accelerators such as calcium chloride, and calcium nitrite and organic accelerators such as alkanolamines. The preferable amount of this agent added to the binder such as cement is 0 to 20 parts by weight.

Examples of the thickening agent and separation inhibitor, which are the additives for mortar and concrete include (1) cellulose base water-soluble polymers such as cellulose ethers (MC and the like), (2) polyacrylamide-base water-soluble polymers such as polyacrylamides, (3) biopolymers such as curdlan and welan gum; (4) non-ionic thickening agents such as fatty acid diesters of a polyalkylene glycol, and urethane condensates of a polyalkylene glycol. The preferable compounding proportion of this agent is 0 to 1.5 percent by weight with respect to the concrete composition.

EXAMPLES

Hereinafter, the present invention will be described in detail with reference to the examples; however, the present invention is not limited thereto.

Synthesis of Water-Soluble Amphoteric Copolymer

Example 1

<Method for Forming Compound A-1>

Into a reaction vessel equipped with a stirrer, 103 g (1.00 mole) of diethylenetriamine and 97.3 g (0.67 moles) of adipic acid were charged, and the mixture thus obtained was mixed together by stirring in a nitrogen atmosphere by introduction of nitrogen. The temperature was increased to 150° C., and the reaction was continued for 20 hours until the acid value reached 22 while removing water of the reaction product accompanied with polycondensation. Next, 1.1 g of hydroquinone methyl ether and 27.5 g (0.32 moles) of methacrylic acid were charged and were allowed to react at the same temperature (150° C.) for 10 hours. Accordingly, 187 g of a polyamide polyamine (melting point of 122° C., acid value of 23) was obtained together with 42 g in total of reaction distilled water. The total amount of the polyamide polyamine thus obtained was dissolved in 272 g of water, and the temperature was increased to 50° C. Furthermore, 220 g of ethylene oxide (corresponding to 3.0 moles to the total amino residues including unreacted amino groups) was sequentially added over 4 hours at the same temperature (50° C.), and matured for 2 hours. Accordingly, 680 g (solid content of 60%) of the compound A-1 of the present invention was obtained.

<Manufacturing Method 1 of Example 1>

Next, 314 g of water was charged into a reaction vessel equipped with a stirrer, and nitrogen was introduced thereinto to make the inside of synthesis system to be a nitrogen atmosphere and the temperature was increased to 80° C. Three solutions of a mixture of 61 g of water, 6.0 g of acrylic acid (compound B-1), 18.7 g of methacrylic acid (compound B-2), 169 g of a methoxypolyethylene glycol monomethacrylate (compound C, molecular weight of approximately 2000) and 169 g of a methoxypolyethylene glycol monoacrylate (compound D, molecular weight of approximately 1000), 78.4 g of a 5% ammonium thioglycolate aqueous solution and 78.4 g of a 5% ammonium persulfate aqueous solution were simultaneously dropwise added to the synthesis system over 2 hours. After completion of the above dropwise addition, 42.7 g of the compound A-1 was dropwise added over 30 minutes, and 39.2 g of a 5% ammonium persulfate aqueous solution was dropwise added over 1 hour. (When the solid contents were represented by weight ratios, the compound A/the compound B (total of the compounds B-1 and B-2)/the compound C/the compound D=6 percent by weight/8 percent by weight/43 percent by weight/43 percent by weight, and the total thereof was 100 parts by weight.) Subsequently, maturing and cooling was performed for 2 hours, and neutralization was performed using a 48% NaOH aqueous solution until a pH of 6 was obtained, thereby obtaining 1,000 g of a water-soluble amphoteric copolymer. This copolymer was a copolymer having a weight average molecular weight of 42,000 which was measured by GPC molecular weight measurement. The measurement conditions are as follows.

Column: OHpak SB-803HQ, OHpak SB-804HQ (manufactured by Showa Denko K. K.)

Eluent: a 50-mM sodium nitrate aqueous solution and acetonitrile at a ratio of 80 percent by weight:20 percent by weight Detector: Differential refractometer Calibration Line: Polyethylene glycol <Manufacturing Method 2 of Example 1>

Next, 314 g of water was charged into a reaction vessel equipped with a stirrer, and while nitrogen was introduced thereinto to make the inside of synthesis system to be a nitrogen atmosphere, the temperature was increased to 80° C. Two solutions, i.e., a mixture of 61 g of water, 6.0 g of acrylic acid (compound B-1), 18.7 g of methacrylic acid (compound B-2), 169 g of a methoxypolyethylene glycol monomethacrylate (compound C, molecular weight of approximately 2000), 169 g of a methoxypolyethylene glycol monoacrylate (compound D, molecular weight of approximately 1000), and 78.4 g of a 5% ammonium thioglycolate aqueous solution, and 78.4 g of a 5% ammonium persulfate aqueous solution were simultaneously dropwise added to the synthesis system over 2 hours. After completion of the above dropwise addition, 42.7 g of the compound A-1 was dropwise added over 30 minutes, and 39.2 g of a 5% ammonium persulfate aqueous solution was dropwise added over 1 hour. (When the solid contents were represented by weight ratios, the compound A/the compound B (total of the compounds B-1 and B-2)/the compound C/the compound D=6 percent by weight/8 percent by weight/43 percent by weight/43 percent by weight, and the total thereof was 100 parts by weight). Subsequently, maturing and cooling was performed for 2 hours, and neutralization was performed using a 48% NaOH aqueous solution until a pH of 6 was obtained, thereby obtaining 1,000 g of a water-soluble amphoteric copolymer. This copolymer was a copolymer having a weight average molecular weight of 41,000 which was measured by GPC molecular weight measurement. The GPC measurement conditions are as follows. Column: OHpak SB-803HQ, OHpak SB-804HQ (manufactured by Showa Denko K. K.) Eluent: a 50-mM sodium nitrate aqueous solution and acetonitrile at a ratio of 80 percent by weight:20 percent by weight Detector: Differential refractometer Calibration Line: Polyethylene glycol The same result was obtained from the Manufacturing Methods 1 and 2 of the Example. Manufacturing of copolymers of the following examples and comparative examples was performed in accordance with the Manufacturing Method 1 of Example 1.

Examples 2-9

Using starting materials shown in Table 1, compounds A-2 to A-6, which were each an alkylene oxide adduct of a polyamide polyamine, were obtained in the same manner as that in Example 1. In addition, using the compound A, the compound B, the compound C and the compound D shown in Table 2, copolymerization was conducted in the same manner as that of the manufacturing method in Example 1, thereby obtaining water soluble amphoteric copolymers (Examples 2-9) (however, water contents of the copolymers thus obtained were each adjusted so as to have a solid content of 40%).

TABLE 1

Synthetic Examples *1 of Compounds A-1 to A-6

| | | Compound A | | | | | |
|---|---|---|---|---|---|---|---|
| | | A-1 | A-2 | A-3 | A-4 | A-5 | A-6 |
| (a) | DETA *2 | 1.00 | 1.00 | 1.00 | — | 1.00 | — |
| | TETA *3 | — | — | — | 1.00 | — | 1.00 |
| (b) | Adipic Acid | 0.67 | 0.83 | 0.83 | — | 0.80 | 0.91 |
| | Dimethyl Adipate | — | — | — | 0.91 | — | — |
| | Acid Value of Intermediate Condensate *4 | 22 | 19 | 17 | n.d. | 20 | 20 |
| (c) | Acrylic Acid | — | 0.13 | — | — | — | — |
| | Methacrylic Acid | 0.32 | — | 0.17 | — | 0.25 | 0.10 |
| | Methyl Methacrylate | — | — | — | 0.10 | — | — |
| | Acid value of Final Condensate *5 | 23 | 19 | 17 | n.d. | 22 | 20 |
| (d) | Ethylene Oxide | 3.0 | 3.0 | 2.0 | 5.0 | 4.0 | 5.0 |
| | Propylene Oxide | — | 1.0 | — | 1.0 | — | 1.0 |

*1 Components (a) to (d) used for producing the compounds A shown in the table correspond to the compounds a to d described above, and the values each represent a molar ratio.
*2 Diethylenetriamine
*3 Triethylenetetramine
*4 Acid value of the condensate (intermediate condensate) of the compounds a and b
*5 Acid value of the condensate (final condensate) of the compounds a, b and c
n.d. means that measurement can not be made, because of using esters of dibasic acid

TABLE 2

Examples 1 to 9 *1

| | Example No. | | | | | | | | |
|---|---|---|---|---|---|---|---|---|---|
| | 1 | 2 | 3 | 4 | 5 | 6 | 7 | 8 | 9 |
| Compound A | | | | | | | | | |
| A-1 | 6 | — | — | — | — | — | — | — | — |
| A-2 | — | 15 | — | — | — | 20 | — | — | 11 |
| A-3 | — | — | 6 | 6 | — | — | 5 | — | — |
| A-4 | — | — | — | — | 10 | — | — | — | — |
| A-5 | — | — | — | — | — | — | — | 7 | — |
| A-6 | — | — | — | — | — | — | — | — | — |
| Compound B | | | | | | | | | |
| B-1 *2 | 2 | — | 3 | — | 5 | 1 | — | — | 1 |
| B-2 *3 | 6 | 10 | 5 | 8 | 10 | 7 | 9 | 7 | 11 |
| Compound C | | | | | | | | | |
| C-1 *4 | — | — | — | — | — | 43 | — | — | 50 |
| C-2 *5 | — | 35 | — | 64 | — | — | — | — | — |
| C-3 *6 | 43 | — | 22 | — | — | — | 56 | 57 | — |
| C-4 *7 | — | — | — | — | 20 | — | — | — | — |
| Compound D | | | | | | | | | |
| D-1 *8 | — | 20 | — | — | 40 | 8 | 17 | — | 15 |
| D-2 *9 | — | — | — | — | 15 | 21 | — | 17 | — |
| D-3 *10 | 43 | 20 | 64 | 22 | — | — | 13 | 12 | 12 |
| Weight Average molecular weight of copolymer ($\times 10^3$) | 42 | 47 | 53 | 48 | 46 | 57 | 44 | 47 | 62 |

Method for Calculating a Compounding Ratio:

In order to understand the compounding ratio of each monomer incorporated in a finished copolymer, the ratio of the compound B is calculated in the form of a salt.

Calculation Example of the Compounding Ratio in Example 1

The compound A-1: 42.7 g (the solid content being 42.7×0.6=25.6), the compound B-1: 6.0 g, (the solid content being 94 (molecular weight of sodium acrylate)×6.0 g/72 (molecular weight of acrylic acid)=7.8 g, the compound B-2: 18.7 g, (the solid content being 108 (molecular weight of sodium methacrylate)×18.7 g/86 (molecular weight of methacrylic acid)=23.5 g), the compound C: 169 g, and the compound D: 169 g, each of which is 100 percent of the solid content.

The compound A: compound B (total of compounds B-1 and B-2): compound C: compound D=25.6:31.3:169:169 (in solid content)=6 percent by weight:8 percent by weight:43 percent by weight:43 percent by weight 1 Values of the compounds A to C in the table are represented by parts by weight on a solid content basis.
2 sodium acrylate
3 sodium methacrylate
4 methoxypolyethylene glycol methacrylate (molecular weight of 250)
5 methoxypolyethylene glycol methacrylate (molecular weight of 1000)
6 methoxypolyethylene glycol methacrylate (molecular weight of 2000)
7 methoxypolyethylene glycol methacrylate (molecular weight of 4000)
8 methoxypolyethylene glycol acrylate (molecular weight of 250)
9 methoxypolyethylene glycol acrylate (molecular weight of 400)
10 methoxypolyethylene glycol acrylate (molecular weight of 1000)

Comparative Examples 1 to 4

Condensation compounds were synthesized (compounds A'-1 to A'-4) in the same manner as that in Example 1 except that the reaction proportion of the polyalkylene polyamine, dibasic acid, and methacrylic acid was out of the range described in the present invention. In Table 3, Synthetic Examples are shown. Subsequently, the compound A-1 and compounds A'-1 to A'-4 were copolymerized with the compounds B, C and D to obtain water-soluble amphoteric copolymers (Comparative Examples 1 to 7). In Table 4, the Synthetic Examples of the copolymers are shown.

TABLE 3

Synthetic Examples *1 of Compounds A'-1 to A'-4 (Comparative Compounds)

| | | Comparative Compound A' | | | |
|---|---|---|---|---|---|
| | | A'-1 | A'-2 | A'-3 | A'-4 |
| (a) | DETA *2 | 1.00 | — | 1.00 | 1.00 |
| | TETA *3 | — | 1.00 | — | — |
| (b) | Adipic Acid | 0.67 | 0.83 | 0.83 | 0.67 |
| | Acid Value of Intermediate Condensate *4 | 20 | 17 | 15 | 23 |
| (c) | Acrylic Acid | 0.03 | — | 0.90 | — |
| | Methacrylic Acid | — | 0.01 | — | 0.90 |
| | Acid value of Final Condensate *5 | 17 | 22 | 20 | 28 |
| (d) | Ethylene Oxide | 3.0 | 3.0 | 4.0 | 1.0 |

*1 Components (a) to (d) used for producing the compounds A' shown in the table correspond to the compounds a to d described above, and the values each represent a molar ratio
*2 Diethylenetriamine,
*3 Triethylenetetramine
*4 Acid value of the condensate (intermediate condensate) of the compounds a and b
*5 Acid value of the condensate (final condensate) of the compounds a, b and c

TABLE 4

Comparative Examples 1 to 7 *1

| | Comparative Example No. | | | | | | |
|---|---|---|---|---|---|---|---|
| | 1 | 2 | 3 | 4 | 5 | 6 | 7 |
| Compound A | | | | | | | |
| A-1 | — | — | — | — | — | 15 | 15 |
| Compound A' | | | | | | | |
| A'-1 | 15 | — | — | — | — | — | — |
| A'-2 | — | 15 | — | — | — | — | — |
| A'-3 | — | — | 15 | — | — | — | — |
| A'-4 | — | — | — | 15 | — | — | — |
| Compound B | | | | | | | |
| B-1 *2 | — | — | — | — | 20 | — | — |
| B-2 *3 | 23 | 23 | 23 | 23 | — | 23 | 23 |
| Compound C | | | | | | | |
| C-1 *4 | — | — | — | — | — | — | 62 |
| C-2 *5 | 16 | 16 | 16 | 16 | — | — | — |
| C-2 *6 | — | — | — | — | — | 62 | — |
| Compound D | | | | | | | |
| D-1 *7 | 46 | 46 | 46 | 46 | — | — | — |
| D-2 *8 | — | — | — | — | — | — | — |
| D-3 *9 | — | — | — | — | 80 | — | — |
| Weight average molecular weight of copolymer (×10$^3$) | 28 *10 | 34 *10 | gelation | gelation | 45 | 38 | 45 |

Recipes are determined in accordance with the compounding-ratio calculation method shown in Table 2.

1 Values of the compounds A', the compound B, the compound C and the compound D in the table are represented by parts by weight on a solid component basis.
2 sodium acrylate
3 sodium methacrylate
4 methoxypolyethylene glycol methacrylate (molecular weight of 250)
5 methoxypolyethylene glycol methacrylate (molecular weight of 1000)
6 methoxypolyethylene glycol methacrylate (molecular weight of 2000)
7 methoxypolyethylene glycol acrylate (molecular weight of 250)

8 methoxypolyethylene glycol acrylate (molecular weight of 400)
9 methoxypolyethylene glycol acrylate (molecular weight of 1,000)
10 the compound A' was not incorporated into the copolymer, and as a result, the water reducing property and slump stability with time were seriously degraded.

<Mortar Flow Test>

By using the cement dispersants (1) to (9) of the present invention, and the comparative cement dispersants (1) to (7), mortar was prepared, and the flow value thereof was measured.

Test Method of Mortar Flow

Ordinary Portland cement (manufactured by Taiheiyo Cement Corp.) in an amount of 200 g, and 260 g of siliceous sand No. 6 (manufactured by Nippon Plaster Inc.) were weighed, and dry mixing was performed for 90 seconds. Next, 0.448 g (in terms of solid content) of each of the copolymers obtained in Examples 1 to 9 and Comparative Examples 5 to 7 was weighed and was then diluted with water to have a total volume of 90 g, thereby preparing kneading water (water/cement ratio of 45%, and sand/cement ratio of 130%). The mixture of the cement and the sand was charged in the kneading water and mixed together for 180 seconds, thereby forming a mortar paste. Conditions of the dry mixing and the mixing for mortar formation were very carefully performed so as to always obtain uniform materials.

<Measurement of Mortar Flow and Result Thereof>

The mortar thus prepared was poured into a hollow cylindrical container and charged up to the top end of the container, the container having φ 50 mm and H 50 mm and being placed on a plate made of an acrylic resin. Immediately after charging, the hollow cylindrical container was lifted up at a predetermined rate in a direction perpendicular to the acrylic resin-made plate. After the mortar stopped spreading and completely stood still, the maximum diameter of the spread of the mortar and the diameter perpendicular thereto were measured, and the average was obtained from the two diameters thus measured. The procedure described above was performed immediately after the formation of the mortar paste and was also performed after 60, 120, and 180 minutes. In this case, the period of kneading performed for measurement at each measurement time was set to 90 seconds. In addition, immediately after the kneading to the end of the measurement performed 180 minutes after the start, in order to prevent the evaporation of moisture, a container containing the mortar paste was covered with a plastic sheet and was placed still.

<Result of Mortar Flow Test>

TABLE 5

| | Mortar flow value (mm) | | | |
|---|---|---|---|---|
| | Immediately after formation | After 60 minutes | After 120 minutes | After 180 minutes |
| Example 1 | 122 | 142 | 143 | 140 |
| Example 2 | 130 | 153 | 152 | 144 |
| Example 3 | 155 | 180 | 186 | 188 |
| Example 4 | 148 | 155 | 157 | 140 |
| Example 5 | 162 | 165 | 160 | 136 |
| Example 6 | 72 | 132 | 133 | 133 |
| Example 7 | 106 | 172 | 182 | 174 |
| Example 8 | 65 | 93 | 143 | 148 |
| Example 9 | 122 | 182 | 178 | 173 |

TABLE 5-continued

| | Mortar flow value (mm) | | | |
|---|---|---|---|---|
| | Immediately after formation | After 60 minutes | After 120 minutes | After 180 minutes |
| Comparative Example 5 | 183 | 186 | 156 | 134 |
| Comparative Example 6 | 185 | 184 | 175 | 163 |
| Comparative Example 7 | 134 | 136 | 123 | 112 |

According to the result of the mortar flow test, compared to that of Comparative Examples 5 to 7, the effect of exhibiting the dispersibility was slow in Examples 1 to 9, and the dispersibility thereof is increased with time.

<Measurement of Adsorption Amount>

From mortar prepared in accordance with the mortar flow test, a supernatant liquid was filtrated, and the amount of an organic carbon in the filtrate was measured, so that the adsorption rate to cement was calculated.

×Total Organic Carbon Analyzer: TOC-5000A manufactured by Shimadzu Corp

Calculation Method of Cement Adsorption Rate: Cement Adsorption Rate={(the amount of organic carbon in water containing the cement dispersant of the present invention prepared before mortar is formed)−(the amount of organic carbon in a filtrate obtained by suction filtration of a mortar paste)}×100/(the amount of organic carbon in water containing the cement dispersant of the present invention prepared before mortar is formed)

TABLE 6

Measurement Result of Adsorption Amount of Cement Dispersant

| | After 60 minutes | After 120 minutes | After 180 minutes |
|---|---|---|---|
| Example 7 | 6% | 17% | 23% |
| Comparative Example 6 | 33% | 39% | 40% |

The amount of the cement dispersant of the present invention, which is adsorbed to the cement, is increased with time elapsed, and the dispersion performance of mortar also tends to increase. On the other hand, the amount of adsorption in Comparative Example 6 was not substantially changed, and as a result, the dispersion performance of mortar decreased fast as compared to that of the cement dispersant of the present invention.

Evaluation of Water-Soluble Amphoteric Copolymer by Concrete Test

I. Case in Which the Water-soluble Amphoteric Copolymer is Only Used

In this case, as the evaluation when the water-soluble amphoteric copolymer was only used, a concrete test was performed. A forced action two-shaft mixer having a volume of 55 liters was used for kneading concrete, and after water containing a cement dispersant of the water-soluble amphoteric copolymer was added to cement and fine aggregates and was then kneaded therewith for 60 seconds, course aggregates were thrown into the mixer, followed by kneading for 90 seconds. The performance (slump flow in accordance with JIS A 1150, and air content in accordance with JIS A 1128) of fresh concrete was measured immediately after the discharge of the concrete, and was also measured after 1 hour and 2 hours. In addition, a test of the compressive strength (JIS A 1108) was also performed.

TABLE 7

Formulation of Concrete unit (kg/m³)

| W/C (%) | Water *1 | Cement *2 | Fine aggregates *3 | Course aggregates *4 |
|---|---|---|---|---|
| 30.0 | 165 | 550 | 844 | 856 |

*1 Tap water
*2 Low heat Portland cement (density of 3.22 g/cm³)
*3 Land sand (from Kimitsu, density of 2.63 g/cm³)
*4 Lime crushed stone (from Torikatayama, density of 2.70 g/cm³)

TABLE 8

Concrete test result

| Copolymer No. | Amount added *1 | Immediately after | | | 1 Hour | | | 2 Hours | | |
|---|---|---|---|---|---|---|---|---|---|---|
| | | Slump flow(cm) | 50 cm (sec.) | Air content (%) | Slump flow(cm) | 50 cm (sec.) | Air content (%) | Slump flow(cm) | 50 cm (sec.) | Air content (%) |
| Example 1 | 0.30 | 55 | 6.3 | 2.0 | 69 | 5.2 | 1.8 | 68 | 5.8 | 1.7 |
| Example 2 | 0.33 | 60 | 4.8 | 1.8 | 70 | 4.2 | 1.6 | 70 | 5.0 | 1.5 |
| Example 3 | 0.25 | 60 | 4.4 | 1.9 | 69 | 4.1 | 1.9 | 64 | 4.9 | 1.8 |
| Example 4 | 0.30 | 60 | 4.6 | 1.5 | 65 | 5.1 | 1.8 | 60 | 5.9 | 1.8 |
| Example 5 | 0.44 | 65 | 4.9 | 1.6 | 65 | 5.2 | 1.4 | 60 | 6.0 | 1.7 |
| Example 6 | 0.31 | 50 | 8.1 | 1.9 | 65 | 7.3 | 1.4 | 68 | 7.6 | 1.4 |
| Example 7 | 0.28 | 54 | 6.8 | 1.7 | 68 | 5.2 | 1.8 | 62 | 6.6 | 1.7 |
| Example 8 | 0.32 | 40 | — | 2.3 | 55 | 7.6 | 2.1 | 67 | 6.1 | 1.8 |
| Example 9 | 0.25 | 55 | 6.6 | 2.1 | 68 | 5.1 | 1.6 | 62 | 6.1 | 1.5 |
| Comparative Example 7 | 0.45 | 68 | 4.1 | 1.6 | 61 | 6.2 | 1.7 | 55 | 7.6 | 1.9 |

*1 amount (solid content) of the cement dispersant added to the cement mass is indicated, and the unit is percent by weight

TABLE 9

Result of Compressive Strength

Compressive strength (N/mm²)

| Copolymer No. | Material age 28 days | Material age 91 days |
|---|---|---|
| Example 1 | 82.4 | 96.4 |
| Example 2 | 83.1 | 98.2 |
| Example 3 | 82.8 | 98.8 |
| Example 4 | 79.8 | 94.8 |
| Example 5 | 78.9 | 94.5 |
| Example 6 | 83.3 | 98.7 |
| Example 7 | 84.8 | 99.1 |
| Example 8 | 83.1 | 97.4 |
| Example 9 | 81.1 | 96.4 |

The water-soluble amphoteric copolymer of the present invention had a controlled-release property in which the slump was increased with time elapsed, and moreover, the controlled-release property was stable, and as a result, the concrete viscosity was also low. According to Japanese Architectural Standard Specification JASS 5(1997) published by Architectural Institute of Japan, the time limitation for transportation of concrete is set to 120 minutes; however, even when the time limitation is more than that, this cement dispersant may not cause any problems at all and has a stable slump retention property.

II. Concrete Test Result Obtained in the Case in Which the Water-soluble Amphoteric Copolymer is Compounded with a Different Cement Dispersant In this case, as the evaluation when the water-soluble amphoteric copolymer was compounded with a different cement dispersant, Concrete Test 1 was performed using low heat Portland cement, and Concrete Test 2 was performed using ordinary Portland cement. A 55 liters forced twin-screw mixer was used for kneading concrete, and after water in which the water-soluble amphoteric copolymer and the different cement dispersant were dissolved was added to cement and fine aggregates and was then kneaded for 60 seconds, course aggregates were thrown into the mixer, followed by kneading for 90 seconds. The performance (slump flow in accordance with JIS A 1150, and air content in accordance with JIS A 1128) of fresh concrete was measured immediately after the discharge of the concrete, and was also measured after 1 hour and 2 hours. In addition, a test of the compressive strength (JIS A 1108) was also performed.

Concrete Test 1

TABLE 10

Formulation of Concrete unit (kg/m³)

| W/C (%) | Water *1 | Cement *2 | Fine aggregates *3 | Course aggregates *4 |
|---|---|---|---|---|
| 30.0 | 165 | 550 | 844 | 856 |

*1 Tap water
*2 Low heat Portland cement (density of 3.22 g/cm³)
*3 Land sand (density of 2.63 g/cm³)
*4 Lime crushed stone (density of 2.70 g/cm³)

TABLE 11

| | | Concrete test result | | | | | | | |
|---|---|---|---|---|---|---|---|---|---|
| | | Immediately after | | | 1 Hour | | | 2 Hours | | |
| Copolymer No. | Amount added *1 | Slump flow(cm) | 50 cm (sec.) | Air content (%) | Slump flow(cm) | 50 cm (sec.) | Air content (%) | Slump flow(cm) | 50 cm (sec.) | Air content (%) |
| Example 1 | 0.30 | 55 | 6.3 | 2.0 | 69 | 5.2 | 1.8 | 68 | 5.8 | 1.7 |
| Mixture *1 | 0.40 | 62 | 4.9 | 1.9 | 68 | 5.5 | 1.5 | 65 | 6.0 | 1.6 |

*1 amount (solid content) of the cement dispersant added to the cement mass is indicated, and the unit is percent by weight
*2 Example 1:Comparative Example 6 = 70:30 (percent by weight)

TABLE 12

| | Result of Compressive Strength | |
|---|---|---|
| | Compressive strength (N/mm$^2$) | |
| Copolymer No. | Material age 28 days | Material age 91 days |
| Example 1 | 82.4 | 96.4 |
| Mixture *1 | 82.8 | 97.9 |

*1 Example 1:Comparative Example 6 = 70:30 (parts by weight)

When the cement dispersant of the present invention and the different cement dispersant were used together, a stable slump flow was secured, the concrete viscosity was low, and hardening was performed without causing any problems.

Concrete Test 2

TABLE 13

| Formulation of Concrete | | | | |
|---|---|---|---|---|
| | | unit (kg/m$^3$) | | |
| W/C (%) | Water *1 | Cement *2 | Fine aggregates *3 | Course aggregates *4 |
| 27.0 | 165 | 612 | 788 | 850 |

*1 Tap water
*2 Ordinary Portland cement (density of 3.15 g/cm$^3$)
*3 Land sand (density of 2.63 g/cm$^3$)
*4 Hard crushed stone (density of 2.65 g/cm$^3$)

TABLE 14

| | | Concrete test result | | | | | | | | |
|---|---|---|---|---|---|---|---|---|---|---|
| | | Immediately after | | | 1 Hour | | | 2 Hours | | |
| Copolymer No. | Amount added *1 | Slump flow(cm) | 50 cm (sec.) | Air content (%) | Slump flow(cm) | 50 cm (sec.) | Air content (%) | Slump flow(cm) | 50 cm (sec.) | Air content (%) |
| Example 1 | 0.40 | 50 | — | 2.2 | 65 | 6.3 | 1.9 | 62 | 6.9 | 1.9 |
| Mixture *1 | 0.48 | 60 | 6.1 | 2.1 | 69 | 6.4 | 1.8 | 66 | 6.6 | 1.7 |

*1 amount (solid content) of the cement dispersant added to the cement mass is indicated, and the unit is percent by weight
*2 Example 7:Comparative Example 6 = 50:50 (percent by weight)

TABLE 15

| | Result of Compressive Strength | |
|---|---|---|
| | Compressive strength (N/mm$^2$) | |
| Copolymer No. | Material age 7 days | Material age 28 days |
| Example 7 | 79.3 | 96.9 |
| Mixture *1 | 80.2 | 97.8 |

When the cement dispersant of the present invention and the cement dispersant different therefrom were used together, a stable slump flow with time was secured even when the type of cement was changed, and the concrete viscosity was also low.

The invention claimed is:

1. A cement dispersant comprising a water-soluble amphoteric copolymer, or a partly or a fully neutralized salt thereof, the copolymer being formed by copolymerizing a monomer mixture containing as a primary monomer component:
at least one compound (compound A) obtained by addition of 0 to 8 moles of an alkylene oxide having 2 to 4 carbon atoms with respect to one equivalent of a residual amino group of a polyamide polyamine obtained by condensation of 1.0 mole of a polyalkylene polyamine, 0.5 to 0.95 moles of a dibasic acid or an ester the dibasic acid with a lower alcohol having 1 to 4 carbon atoms, and 0.05 to 0.70 moles of acrylic acid or methacrylic acid, or an ester of the acrylic acid or methacrylic acid with a lower alcohol having 1 to 4 carbon atoms;

at least one compound (compound B) represented by general formula (1)

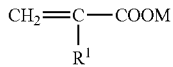 (1)

wherein $R^1$ represents a hydrogen atom or a methyl group, and M represents a hydrogen atom, an alkali metal, an alkali earth metal, an ammonium group, or an alkanol ammonium group;

at least one compound (compound C) represented by general formula (2)

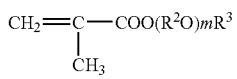 (2)

wherein $R^2$ represents an alkylene group having 2 to 4 carbon atoms, $R^3$ represents a hydrogen atom or an alkyl group having 1 to 4 carbon atoms, and m represents the number of addition molecules of a polyalkylene glycol and is an integer of 1 to 100; and at least one compound (compound D) represented by general formula (3)

$$CH_2{=}CH{-}COO(R^4O)nR^5 \quad (3)$$

wherein $R^4$ represents an alkylene group having 2 to 4 carbon atoms, $R^5$ represents a hydrogen atom or an alkyl group having 1 to 4 carbon atoms, and n represents the number of molecules of a polyalkylene glycol for addition and is an integer of 1 to 100, wherein, when the cement dispersant is added to and is compounded with a concrete composition, dispersion performance increases with time.

2. The cement dispersant according to claim 1 wherein the water-soluble amphoteric copolymer, or the partly or the fully neutralized salt thereof is formed by copolymerizing the monomer mixture in which the proportion of the compounds A, B, C and D on a percent by weight basis are set to 5 to 25 percent by weight, 1 to 20 percent by weight, 10 to 70 percent by weight and 10 to 70 percent by weight, and in which the total thereof is set to 100 percent by weight.

3. An admixture for mortar and concrete, comprising a composition which contains the cement dispersant according to claim 1 and at least one of additives for other mortar and concrete selected from the group consisting of a cement dispersant different from said cement dispersant, a defoaming agent and an air-entraining agent.

4. A concrete composition comprising the cement dispersant according to claim 1.

5. An admixture for mortar and concrete, comprising a composition which contains the cement dispersant according to claim 2 and at least one of additives for other mortar and concrete selected from the group consisting of a cement dispersant different from said cement dispersant, a defoaming agent and an air-entraining agent.

6. A concrete composition comprising the cement dispersant according to claim 2.

7. A concrete composition comprising the admixture for mortar and concrete according to claim 3.

* * * * *